US012499359B2

(12) United States Patent
Riedmiller et al.

(10) Patent No.: US 12,499,359 B2
(45) Date of Patent: Dec. 16, 2025

(54) GRAPH NEURAL NETWORKS REPRESENTING PHYSICAL SYSTEMS

(71) Applicant: DeepMind Technologies Limited, London (GB)

(72) Inventors: Martin Riedmiller, Balgheim (DE); Raia Thais Hadsell, London (GB); Peter William Battaglia, London (GB); Joshua Merel, London (GB); Jost Tobias Springenberg, London (GB); Alvaro Sanchez, London (GB); Nicolas Manfred Otto Heess, London (GB)

(73) Assignee: GDM Holding LLC, Mountain View, CA (US)

( * ) Notice: Subject to any disclaimer, the term of this patent is extended or adjusted under 35 U.S.C. 154(b) by 824 days.

(21) Appl. No.: 17/046,963

(22) PCT Filed: Apr. 12, 2019

(86) PCT No.: PCT/EP2019/059431
§ 371 (c)(1),
(2) Date: Oct. 12, 2020

(87) PCT Pub. No.: WO2019/197613
PCT Pub. Date: Oct. 17, 2019

(65) Prior Publication Data
US 2021/0049467 A1 Feb. 18, 2021

Related U.S. Application Data

(60) Provisional application No. 62/656,904, filed on Apr. 12, 2018.

(51) Int. Cl.
G06N 3/08 (2023.01)

(52) U.S. Cl.
CPC ..................... G06N 3/08 (2013.01)

(58) Field of Classification Search
CPC ........ G06N 3/08; G06N 3/042; G06N 3/0442; G06N 3/045; G06N 3/092; G06N 3/084; G06N 3/008
See application file for complete search history.

(56) References Cited

U.S. PATENT DOCUMENTS 11,323,334 B2 *  5/2022  Altshuler ............... H04L 41/142
11,604,957 B1 *  3/2023  Schubert ................ G06N 3/082
(Continued)

FOREIGN PATENT DOCUMENTS

CN        105637540        6/2016

OTHER PUBLICATIONS

Wang et al. ("NerveNet: Learning Structured Policy with Graph Neural Networks", ICLR Feb. 15, 2018) (Year: 2018).*

(Continued)

Primary Examiner — Imad Kassim
(74) Attorney, Agent, or Firm — Fish & Richardson P.C.

(57) ABSTRACT

A graph neural network system for processing data representing a physical system is disclosed. The graph neural network system receives physical system data and action data, where the physical system includes bodies coupled by joints. The graph neural network system processes an input graph to provide an output graph, the input and output graphs each having a graph structure including nodes and edges corresponding, respectively, to the bodies and joints of the physical system. The graph processing neural network provides the inferred static property or dynamic state of the physical system. The graph processing neural network is differentiable and may be used for control and/or reinforcement learning.

17 Claims, 11 Drawing Sheets

(56) References Cited

U.S. PATENT DOCUMENTS

| | | | |
|---|---|---|---|
| 11,886,352 B2* | 1/2024 | Liu | G06F 12/0238 |
| 2003/0110300 A1 | 6/2003 | Chen | |
| 2013/0159231 A1* | 6/2013 | Modha | G06N 3/04 |
| | | | 706/27 |
| 2018/0070864 A1* | 3/2018 | Schuster | G16H 40/63 |
| 2018/0204108 A1* | 7/2018 | Mital | G09B 19/00 |
| 2019/0005384 A1* | 1/2019 | Sundar | G06N 3/084 |
| 2020/0074246 A1* | 3/2020 | Goyal | G06N 3/088 |

OTHER PUBLICATIONS

Gao et al. ("Efficient representation of quantum many-body states with deep neural networks", nature communication, Sep. 22, 2017) (Year: 2017).*

Gu et al. ("Deep Reinforcement Learning for Robotic Manipulation with Asynchronous Off-Policy Updates", IEEE, May 29-Jun. 3, 2017) (Year: 2017).*

Kipf et al. ("Neural Relational Inference for Interacting Systems", Proceedings of the 35th International Conference on Machine Learning, Stockholm, Sweden, PMLR 80, 2018) (Year: 2018).*

Amos et al., "Learning awareness models," CoRR, Apr. 2018, arxiv.org/abs/1804.06318, 19 pages.

Atkeson et al., "A comparison of direct and model-based reinforcement learning," International Conference on Robotics and Automation, 1997, 4:3557-3564.

Battaglia et al., "Interaction Networks for Learning about Objects, Relations and Physics," Advances in Neural Information Processing Systems 29, 2016, 12 pages.

Battaglia et al., "Simulation as an engine of physical scene understanding," Proceedings of the National Academy of Sciences, 2013, 110(45):18327-18332.

Bronstein et al., "Geometric deep learning: going beyond euclidean data," IEEE Signal Processing Magazine, 2017, 34(4):18-42.

Bruna et al., "Spectral networks and locally connected networks on graphs," CoRR, Dec. 2013, arXiv:1312.6203, 14 pages.

Chang et al., "A compositional object-based approach to learning physical dynamics," CoRR, Dec. 2016, arXiv:1612.00341, 15 pages.

Cho et al., "On the properties of neural machine translation: Encoder-decoder approaches," CoRR, Sep. 2014, arXiv:1409.1259, 9 pages.

Defferrard et al., "Convolutional neural networks on graphs with fast localized spectral filtering," Advances in Neural Information Processing Systems 29, 2016, 9 pages.

Deisenroth et al., "Pilco: A model-based and data-efficient approach to policy search," Proceedings of the 28th International Conference on Machine Learning, 2011, 8 pages.

Duvenaud et al., "Convolutional networks on graphs for learning molecular fingerprints," Advances in Neural Information Processing Systems 28, 2015, 9 pages.

Ehrhardt et al., "Learning a physical long-term predictor," CoRR, Mar. 2017, arXiv:1703.00247, 10 pages.

Fragkiadaki et al., "Learning visual predictive models of physics for playing billiards," CoRR, Nov. 2015, arxiv.org/abs/1511.07404, 12 pages.

Gilmer et al., "Neural message passing for quantum chemistry," CoRR, Apr. 2017, arXiv:1704.01212, 14 pages.

Grzeszczuk et al., "Neuroanimator: Fast neural network emulation and control of physics-based models," Proceedings of the 25th annual conference on Computer graphics and interactive techniques, Jul. 1998, pp. 9-20.

Gu et al., "Continuous deep q-learning with modelbased acceleration," Proceedings of the 33rd International Conference on Machine Learning, 2016, 48: 10 pages.

Hamrick et al., "Metacontrol for adaptive imagination-based optimization," CoRR, May 2017, arXiv:1705.02670, 21 pages.

Heess et al., "Learning Continuous Control Policies by Stochastic Value Gradients," Advances in Neural Information Processing Systems 28, 2015, 9 pages.

Henaff et al., "Deep convolutional networks on graph-structured data," CoRR, Jun. 2015, arXiv:1506.05163, 10 pages.

Houthooft et al., "VIME: Variational Information Maximizing Exploration," CoRR, May 2016, arxiv.org/abs/1605.09674, 11 pages.

Johnson-Laird "Mental models in cognitive science," Cognitive Science, 1980, 4(1):71-115.

Kingma et al., "Auto-Encoding Variational Bayes," CoRR, Dec. 2013, arXiv:1312.6114, 14 pages.

Kipf et al., "Semi-supervised classification with graph convolutional networks," CoRR, Sep. 2016, arXiv:1609.02907, 14 pages.

Levine et al., "Learning neural network policies with guided policy search under unknown dynamics," Advances in Neural Information Processing Systems 27, 2014, 9 pages.

Li et al., "Gated graph sequence neural networks," CoRR, Nov. 2015, arXiv:1511.05493, 20 pages.

Li et al., "Iterative linear quadratic regulator design for nonlinear biological movement systems," In Proceedings of 1st International Conference on Informatics in Control, Automation and Robotics, 2004, 8 pages.

Lillicrap et al., "Continuous control with deep reinforcement learning," CoRR, Sep. 2015, arxiv.org/abs/1509.02971, 14 pages.

Miall et al., "Forward models for physiological motor control," Neural Networks, 1996, 9(8):1265-1279.

Nagabandi et al., "Neural network dynamics for modelbased deep reinforcement learning with model-free finetuning," 2018 IEEE International Conference on Robotics and Automation, May 2018, 10 pages.

Niepert et al., "Learning convolutional neural networks for graphs," Proceedings of the 33 rd International Conference on Machine Learning, 2016, 48:2014-2023.

Pascanu et al., "Learning model-based planning from scratch," CoRR, Jul. 2017, arxiv.org/abs/1707.06170, 13 pages.

PCT International Preliminary Report on Patentability in International International Appln. No. PCT/EP2019/059431, dated Oct. 13, 2020, 13 pages.

PCT International Search Report and Written Opinion in International Appln. No. PCT/EP2019/059431, dated Jul. 25, 2019, 19 pages.

Peng et al., "Sim-to-real transfer of robotic control with dynamics randomization," 2018 IEEE International Conference on Robotics and Automation, May 2018, 8 pages.

Rajeswaran et al., "EPOpt: Learning robust neural network policies using model ensembles," CoRR, Oct. 2016, arxiv.org/abs/1610.01283, 15 pages.

Raposo et al., "Discovering objects and their relations from entangled scene representations," CoRR, Feb. 2017, arXiv:1702.05068, 16 pages.

Rezende et al., "Stochastic backpropagation and approximate inference in deep generative models," CoRR, Jan. 2014, arxiv.org/abs/1401.4082, 14 pages.

Sanchez-Gonzalez et al., "Graph Networks as Learnable Physics Engines for Inference and Control," CoRR, arxiv.org/abs/1806.01242, 21 pages.

Santoro et al., "A simple neural network module for relational reasoning," Advances in Neural Information Processing Systems 30, 2017, 10 pages.

Scarselli et al., "Computational capabilities of graph neural networks," IEEE Transactions on Neural Networks, 2009, 20(1):81-102.

Scarselli et al., "Graph neural networks for ranking web pages," The 2005 IEEE/WIC/ACM International Conference on Web Intelligence, Sep. 2005, 7 pages.

Scarselli et al., "The graph neural network model," IEEE Transactions on Neural Networks, 2009, 20(1):61-80.

Schmidhuber et al., "Curious model-building control systems," Proc. Int. J. Conf. Neural Networks, 1991, 7 pages.

Spelke et al., "Core knowledge," Developmental science, Jan. 2007, 10(1):89-96.

Sun et al., "Planning to be surprised: Optimal bayesian exploration in dynamic environments," Artificial General Intelligence, Lecture Notes in Computer Science, 2011, 6830:41-51.

(56) References Cited

OTHER PUBLICATIONS

Tassa et al., "Control-limited differential dynamic programming," 2014 IEEE International Conference on Robotics and Automation, May 2014, 8 pages.

Tassa et al., "Deepmind control suite," CoRR, Jan. 2018, arXiv:1801.00690, 24 pages.

Tassa et al., "Receding horizon differential dynamic programming," Advances in Neural Information Processing Systems 20, 2007, pp. 1465-1472.

Todorov et al., "Mujoco: A physics engine for model-based control," 2012 IEEE/RSJ International Conference on Intelligent Robots and Systems, Oct. 2012, pp. 5026-5033.

Wang et al., "Nervenet: Learning Structured Policy with Graph Neural Networks," 6th International Conference on Learning Representations, Mar. 2018, pp. 1-26.

Watters et al., "Visual Interaction Networks," Advances in Neural Information Processing Systems 30, 2017, 14 pages.

Yu et al., "Preparing for the unknown: Learning a universal policy with online system identification," CoRR, Feb. 2017, arxiv.org/abs/1702.02453, 10 pages.

Office Action in European Appln. No. 19718138.1, Feb. 6, 2023, 11 pages.

Office Action in Chinese Appln. No. 201980025463.4, Aug. 31, 2023, 33 pages (with English translation).

\* cited by examiner

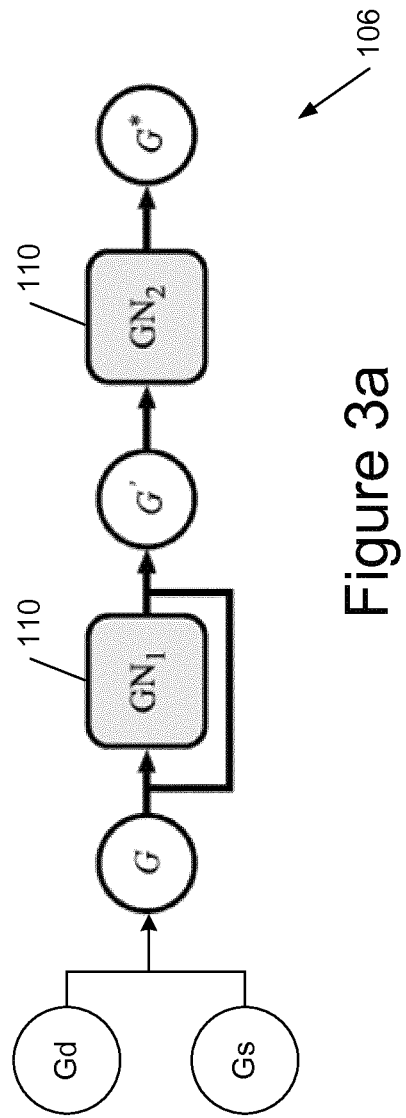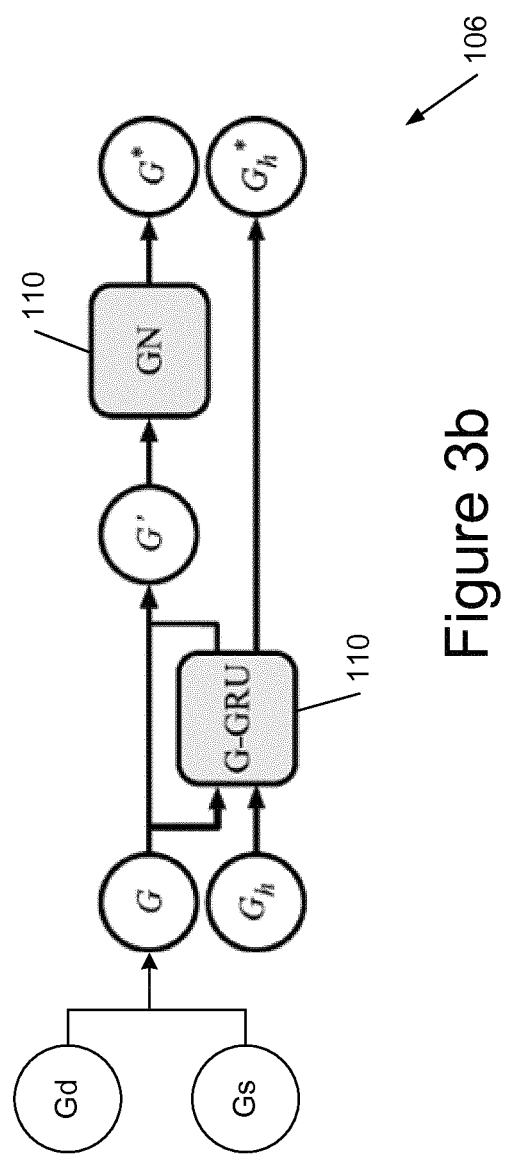
Figure 3a
Figure 3b

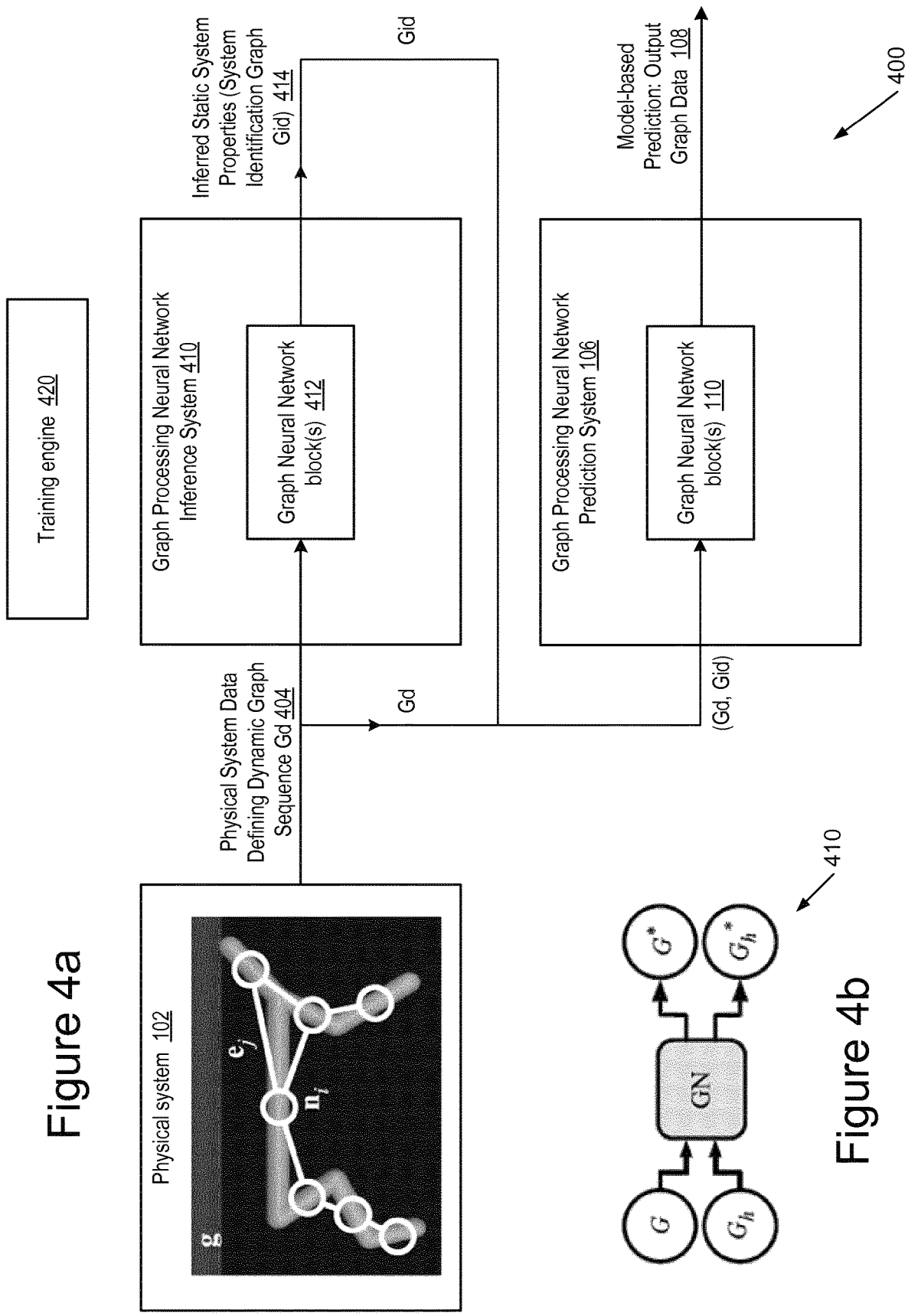

GRAPH NEURAL NETWORKS REPRESENTING PHYSICAL SYSTEMS

CROSS-REFERENCE TO RELATED APPLICATIONS

This application is a National Stage Application under 35 U.S.C. § 371 and claims the benefit of International Application No. PCT/EP2019/059431, filed Apr. 12, 2019, which claims priority to U.S. Provisional Application No. 62/656,904 filed on 12 Apr. 2018, incorporated by reference.

BACKGROUND

This specification relates to neural networks representing physical systems.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks represent and process graph structures comprising nodes connected by edges; the graphs may be multigraphs in which nodes may be connected by multiple edges. The nodes and edges may have associated node features and edge features; these may be updated using node functions and edge functions, which may be implemented by neural networks.

SUMMARY

This specification describes a neural network system implemented as computer programs on one or more computers in one or more locations for processing data representing a physical system. The neural network system may be used to infer static and/or dynamic properties of the physical system. The neural network system may learn to infer these properties by observing the physical system. In some implementations the neural network system may be used to make predictions about the physical system for use in a control task, for example a reinforcement learning task. The physical system may be a real or simulated physical system.

Thus in one aspect the neural network system comprises an input to receive physical system data characterizing the physical system, and action data. The physical system, whether real or simulated, is considered to be composed of bodies coupled by joints. The physical system data comprises at least dynamic data (for) representing motion of the bodies of the physical system. Thus the dynamic data may comprise data representing an instantaneous or dynamic state of the physical system. The action data represents one or more actions applied to the physical system; the actions may be considered to be applied to joints of the physical system.

In implementations the neural network system comprises a graph processing neural network (subsystem) comprising at least one graph network block coupled to the input and trained to process an input graph to provide an output graph. The input and output graphs each have a graph structure comprising nodes and edges, the nodes corresponding to the bodies of the physical system, the edges corresponding to the joints of the physical system. The input graph has input graph nodes comprising input graph node features representing the dynamic data and has input graph edges comprising input graph edge features representing the action data. The output graph has output graph nodes comprising output graph node features and output graph edges comprising output graph edge features. In implementations at least the output graph node features may be different to the input graph node features. The output graph node features comprise features for inferring a static property or dynamic state of the physical system, and the neural network system has an output to provide the inferred static property or dynamic state.

Thus in some implementations the graph network block accepts a first, input graph and provides a second, output graph. The input and output graphs have the same structure but may have different node features and/or edge features and/or, where implemented, different global features. The respective features are defined by feature vectors. The graph network block may include a controller to control graph processing, as described later.

The dynamic data may comprise, for each body, one or more of position data, orientation data, linear or angular velocity data, and acceleration data. The data may be defined in 1, 2 or 3 dimensions, and may comprise absolute and/or relative observations. Some bodies may not provide dynamic data, for example if they are stationary. The action data may comprise, for example, linear or angular force or acceleration data, and/or other control data for example a motor current, associated with action at a joint.

The dynamic data may be input directly or indirectly. For example some cases the dynamic data may be provided by the physical system e.g. robot. In other cases the dynamic data may be derived from observations of the physical system, e.g. from still and/or moving images and/or object position data and/or other sensor data e.g. sensed electronic signals such as motor current or voltage, actuator position signals and the like.

The structure of the input and output graphs may be defined by graph structure data which may be used by the graph processing neural network layer(s) when generating the features of the output graph; or the graph structure may be implicit in the data processing. The nodes and edges of the graph structure may be specified so as to represent bodies and joints of the physical system.

The data input to a graph network block or to the system may be normalized, for example to zero mean and/or unit variance. In particular the dynamic data may be normalized. The same normalization may be applied to all the nodes/edges of a graph. Corresponding inverse normalization may be applied to the data output from a graph network block or from the system. The data from an inferred static graph (see later) need not be normalized.

In implementations the graph network block processes the input graph by processing the edge features of the input graph using an edge neural network to determine edge features of the output graph. For each edge, the edge neural network may receive input from the features of the nodes connected by the edge as well as from the edge. The same edge neural network may be employed to process all the input graph edges. An edge may be directed, from a sender to a receiver node; the edge direction may indicate an expected physical influence of one body on another. Alternatively an edge may be bidirectional; a bidirectional edge may be represented by two oppositely directed unidirectional edges.

In implementations once the output edge features have been determined the output node features are determined.

This may comprise aggregating, for each node, the output graph edge features for the edges connecting to the node. Where edges are directed the features of all the inbound edges may be aggregated. Aggregating the edge features may comprise summing the edge features. The node features for a node may then be provided, together with the aggregated edge features for the node, as an input to a node neural network to determine the output graph node features for the node. The same node neural network may be employed to process all the input graph nodes.

The graph processing neural network may also determine a global feature vector for the output graph. The global feature vector may provide a representation of a collective state of the output graph node and/or edge features. Thus the graph processing neural network may include a global feature neural network receiving aggregated, for example summed, output graph node features and/or aggregated, for example summed, output graph edge features as input, and providing a global feature vector output. Optionally the global feature neural network may also have an input from a global feature vector output from a preceding graph processing neural network layer.

The physical system data may include static data representing static properties of the bodies and/or joints of the physical system. The input graph may comprises a combination of a dynamic graph and a static graph, the dynamic graph comprising the input graph node features representing the dynamic data and the input graph edge features representing the action data, the static graph comprising input graph node and/or edge features representing the static properties of the bodies and/or joints of the physical system.

The output graph node/edge/global features may define a static or dynamic property of the physical system. For example, in some implementations the neural network system may be implemented as a forward predicting model in which the output graph node features define a predicted future dynamic state of the system given a current dynamic state of the system, in particular given action data for one or more actions. Thus the output graph node features may define some or all of the same dynamic data as provided to the input, either as absolute value data or as a change from the input. A forward prediction made by the system may comprise a prediction for a single time step or a rollout prediction over multiple time steps. Each prediction may be used as the starting point for the next, optionally in combination with action data.

In some forward model implementations the graph network block is one of a plurality of graph processing neural network layers, in which case the output graph node features may provide an intermediate, latent representation of the predicted future dynamic state of the system to be processed by one or more subsequent layers to determine the predicted future dynamic state of the system.

In some implementations a graph processing neural network layer may be used to infer one or more static properties of the physical system, which may then be used by one or more further graph network blocks to infer a predicted future dynamic state of the physical system. In some implementations the output graph comprises a latent representation of the inferred static properties.

Static properties of the physical system may comprise properties which are assumed to be unchanging with time. The static properties may include node features such as one or more of: a mass of one or more of the bodies; a moment of inertia (inertia tensor) of one or more of the bodies; and a position or orientation for one or more static bodies. The static properties may include edge features such as an edge direction for one or more of the edges representing a parent-child relationship for bodies connected by a joint, and joint properties for one or more of the joints. The joint properties may indicate, for example, whether the joint has an actuator such as a motor, a type of actuator, characteristics of the actuator, and characteristics of the joint such as stiffness, range and the like.

In some implementations one, static graph is employed to encode static properties of the physical system and another, dynamic graph is employed to encode dynamic properties of the system, with node and edge features as previously described. A global feature vector input to the system may encode global features of the physical system or its environment, for example gravity, viscosity (of a fluid in which the physical system is embedded), or time.

In a forward prediction neural network system, for predicting a future dynamic state of the physical system, the input graph may be a combination of a dynamic graph and a static graph. These two graphs may be concatenated by concatenating their respective edge, node, and where present global, features. The static graph may be defined by input data or inferred from observations of the physical system, as described in more detail below. Where the static graph is inferred it may comprise a latent representation of the static properties of the physical system.

The forward prediction neural network system may comprise two or more graph network blocks. A first graph network block may process the combined input graph to provide a latent graph with a latent representation of the physical system, and then one or more subsequent graph network blocks may process the latent graph to provide an output graph. The output graph may have node features representing the predicted future dynamic state of the physical system. The latent graph may be combined, for example concatenated as previously described, with the input graph to provide a skip connection for the first graph network block.

In some implementations one e.g. the first graph network block may be a recurrent graph neural network processing layer—that is, one or more of the edge neural network, node neural network, and global feature neural network may comprise a recurrent neural network such as a GRU (Gated Recurrent Unit) neural network. The input graph may then comprise a combination (concatenation) of the dynamic graph, the static graph, and a hidden graph. The hidden graph may be derived from a recurrent connection for the recurrent graph network block which may provide an output graph, e.g. a first layer output graph, comprising a combination of graphs such as the latent graph, and an updated hidden graph. The output graph may comprise a concatenation of the features of these graphs which may be split ("graph split") to extract the updated hidden graph for the recurrent connection back to the input. The latent graph may be provided to the next graph network block.

A forward prediction neural network system as described above may be trained using supervised training with example observations of the physical system when subjected to control signals. Noise may be added to the input graph, in particular to the dynamic graph, during training to facilitate the system reassembling unphysical disconnected joints during inference.

In some implementations neural network system may be configured to infer or "identify" properties, in particular static properties of the physical system from observations. The inferred properties may then be provided to a forward prediction neural network system to predict a further dynamic state of the physical system. Such a system may employ a recurrent graph neural network processing layer to process a sequence of observations of the physical system to generate an output graph which provides a representation of the static properties, which may be a latent representation.

Thus a system identification neural network system for identifying static properties of the physical system may have an input is configured to receive dynamic data and action data for a sequence of time steps for defining a sequence of input graphs. For each of the time steps the input graph comprises a combination of a dynamic graph and a hidden graph. The dynamic graph has node features representing the dynamic data for the time step and edge features representing the action data for the time step. The graph network block may thus be an inference rather than a prediction graph network block. The graph network block processes the sequence of input graphs to determine, for each time step, a combination of an output graph representing the static properties of the physical system and an updated hidden graph. The updated hidden graph is split out to provide the hidden graph to the input for the next time step. After the sequence of time steps the output graph comprises a system identification graph in which the output graph node features comprise a representation of static properties of the bodies and/or joints of the physical system.

The system identification neural network system may be used in conjunction with or separately from the forward prediction neural network system. Thus the system identification neural network system may comprise one or more further graph network blocks configured to receive a concatenation of the system identification graph and a dynamic graph, the dynamic graph having node features representing dynamic data for an observed time and edge features representing action data for the observed time. The one or more further graph network blocks may then process the concatenation to provide a dynamic state prediction graph having node features representing a dynamic state of the physical system at a time later than the observed time.

The system identification neural network system may be trained end-to-end with a forward prediction neural network system. For example the system identification neural network system may be provided with a randomly selected sequence of observations of the physical system, and then the combined systems may be provided with a supervised training example representing the physical system at a time step (different to those in the sequence) and at a subsequent time step.

A neural network system as described above may be used to provide action control signals for controlling the physical system dependent upon the inferred dynamic state of the physical system. For example the neural network system may be included in a Model Predictive Control (MPC) system to predict a state or trajectory of the physical system for use by a control algorithm in controlling the physical system, for example to maximize a reward and/or minimize a cost predicted from a future dynamic state of the physical system.

Thus there is described a control system for controlling a physical system, the control system comprising a neural network system as described above, e.g. pre-trained, and a controller configured to use the neural network system to predict one or more future states of the physical system for controlling actions to be applied to the physical system e.g. via one or more action selection outputs indicating actions to be performed.

In another example the neural network system may be included in a reinforcement learning system, for example to estimate a future discounted reward from the predicted future dynamic state of the physical system. Thus the reinforcement learning system may have an action selection policy neural network for selecting actions to be performed by the physical system. The actions may be selected by sampling from a policy distribution or may be provided deterministically by the action selection policy neural network. The policy may be determined according to a policy gradient aiming to maximize an action value. A neural network system as described above may be used to estimate the action value, for example by predicting a future state of the physical system in response to the action.

Thus there is described a reinforcement learning system for controlling a physical system, the reinforcement learning system comprising a neural network system as described above. The reinforcement learning system may be configured to use the neural network system to learn an action selection policy for selecting actions to be applied to the physical system e.g. via one or more action selection outputs indicating actions to be performed.

There is also described a method of training a neural network system as described above, the method comprising providing training data representing examples of a dynamic state of the physical system at a time step, the actions applied, and a next dynamic state of the physical system at a next time step; and training the neural network system to infer the next dynamic state of the physical system. The neural network system may also be trained to infer one or more static properties of the physical system.

The physical system may be any real and/or simulated physical system. For example the physical system may comprise a real or simulated robot, or a real or simulated autonomous or semi-autonomous vehicle, or a device employing any type of robot locomotion, or any physical system with moving parts. The dynamic data representing motion of the bodies of the physical system may be derived in any manner, for example from still or moving images, and/or sensed position or velocity data, and/or from other data.

In some implementations the neural network system may be used as a physics engine in a simulation system or game or in an autonomous or guided reasoning or decision-making system.

Some implementations of the described neural network systems provide very accurate predictions of the behavior of physical systems, in some cases almost indistinguishable from the ground truth. Thus in turn facilitates better, more accurate control of physical systems, and potentially faster learning in a reinforcement learning context.

Because the claimed systems are made up of the described graph network blocks, the systems can learn accurate predictions quickly, which in turn facilitates the use of less data/memory and overall reduced processing power during training. Some implementations of the system are also able to generalize from the example they have learnt on to other physical systems, even systems that they have not seen before. Thus some implementations of the system have increased flexibility which in turn allows them to work across a range of physical system variants without retraining. Thus, when the systems are required to make predictions about the state of multiple different physical systems, the systems use fewer computational resources, e.g., processing power and memory, because the systems do not need to be re-trained before being applied to a new physical system.

Because of the architecture of the graph network blocks, some implementations of the system can infer properties of the observed physical system without this being explicitly defined by a user. This enables the system to work with physical systems in which, as is often the case with real physical systems, the properties are only partially observable. For example implementations of the system are able to infer properties such as robot joint stiffness or limb mass/inertia.

In general implementations of the system can be accurate, robust and generalizable and can thus be used for planning and control in challenging physical settings.

BRIEF DESCRIPTION OF THE DRAWINGS

FIGS. 3a and 3b shows first and second examples of a graph processing neural network prediction system.

FIGS. 4a and 4b show an example neural network system 400 which infers static properties of physical system, and an example graph processing neural network inference system.

Like reference numbers and designations in the various drawings indicate like elements.

DETAILED DESCRIPTION

Figure 1A:
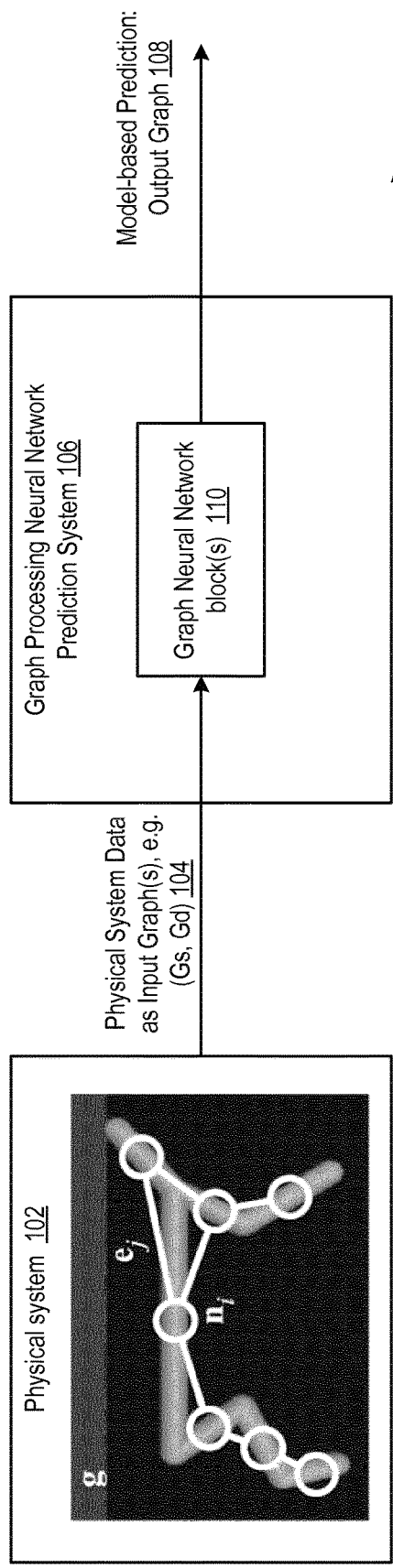
FIGS. 1a and 1b show an example neural network system for processing data representing a physical system, and an example of a graph neural network block.

FIG. 1a shows an example neural network system 100 for processing data representing a physical system 102. The neural network system 100 is an example of a system implemented as computer programs on one or more computers in one or more locations, in which the systems, components, and techniques described below can be implemented.

The neural network system 100 receives physical system data formatted as one or more input graphs 104, as explained further below, and processes the data to provide an output comprising data for inferring a static or dynamic property of the system. As illustrated in FIG. 1a the neural network system 100 comprises a graph processing neural network prediction system 106 to predict a future dynamic state of the physical system 102. The graph processing neural network prediction system 106 comprises one or more graph neural network blocks 110 which process the input graph(s) to provide data for an output graph 108 defining the future dynamic state of the physical system 102. The neural network system 100 may include a training engine 120 to train the graph processing neural network prediction system 106, as described later.

The neural network system 100 can be trained using data from a real or simulated physical system and can then predict the future dynamic state of the physical system from a current state represented by an input graph. In some implementations it can be trained on a simulated physical system and then used to make a prediction for a corresponding real physical system, and vice-versa.

In implementations the input graph represents a structure of the physical system, e.g. nodes of the input graph represent bodies of the physical system and edges of the input graph represent joints or other interactions between the bodies. In general the bodies are connected but this is not essential. For example the bodies may be parts of a robotic system but may include an object manipulated by the system. A physical system without clearly separated bodies, e.g. a soft robot, may be represented by approximating the system using a set of bodies and joints between them.

In some implementations the neural network system 100 can be trained using data from one real or simulated physical system and then used to predict the future dynamic state of a different real or simulated physical system represented by the same graph structure, or even a similar physical system represented by a different graph structure.

As described later, in implementations a graph neural network block 110 applies the same learned function to all the nodes of a graph, and similarly for the edges, and these functions can therefore be applied to graphs of different structures. These functions learn about the shared dynamics between the bodies of the physical system. Applying the same functions to all the nodes/edges of the graph improves the efficiency with which training data is used because there is less learning needed, with the underlying assumption that the nodes/edges represented by the graph follow a similar physical logic. The ability of the graph network approach to generalize across different physical systems also facilitates a reduction in computing resources, memory requirements, and training time which would otherwise be needed.

The prediction of the future dynamic state of a physical system can be used to predict a forward trajectory of the physical system. This may be useful in itself, for example to predict whether a target is being approach or whether a system operating region e.g. a safety region, will be maintained or breached. The prediction of the future dynamic state of the physical system may also be used for control purposes, for example model-based planning and control e.g. in an MPC (Model-Predictive Control) system; or for estimating a policy gradient when learning a continuous or discrete action selection policy e.g. in a reinforcement learning system. Some implementations of the system may also be used to (implicitly) infer parameters of the physical system, e.g. masses of the bodies, for example where these are only partially observable or unknown.

Figure 1B:
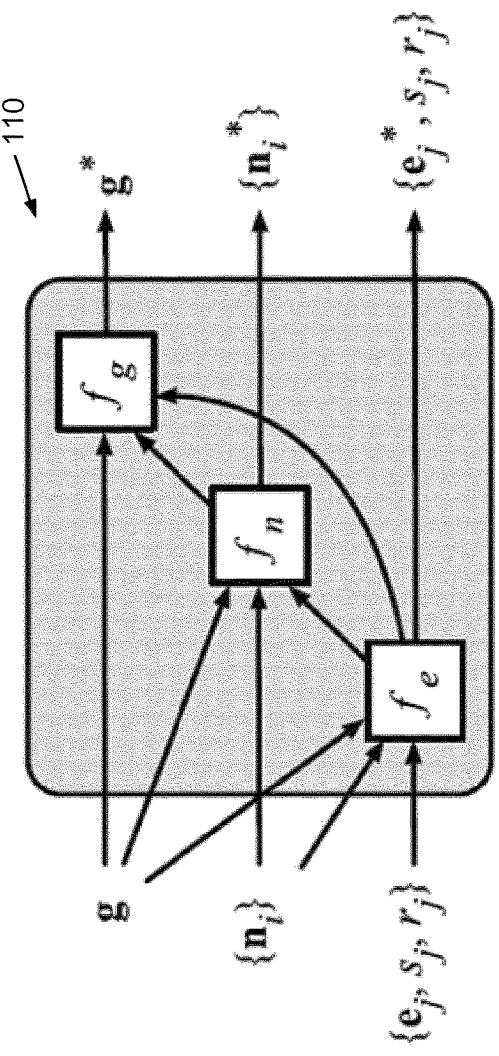

Referring to FIG. 1b, this shows an example of a graph neural network block 110. This block accepts an input directed graph G comprising a set of node features $\{n_i\}_{i=1 \ldots N_n}$ where $N_n$ is the number of nodes and each $n_i$ is a vector of node features; a set of directed edge features $\{e_j, s_j, r_j\}_{j=1 \ldots N_e}$ where $N_e$ is the number of edges and each $e_j$ is a vector of edge features and $s_j$ and $r_j$ are the indices of the sender and receiver nodes respectively; and a vector of global features g. In implementations the static and dynamic properties of the physical system are represented in separate respective graphs, $G_s$ and $G_d$.

In implementations a static graph $G_s$ contains static data relating to parameters of the physical system e.g. representing static properties of the bodies and/or joints of the physical system. Such static information may include, e.g., one or more global parameters such as the current time step, gravity, or viscosity of a fluid in which the physical system operates; per body/node parameters such as body mass or an inertia tensor; and per joint/edge parameters such as edge direction, joint type and/or property data and/or motor type and/or property data.

In implementations a dynamic graph $G_d$ contains dynamic data for representing motion of the bodies of the physical system. Thus the dynamic graph may comprise information relating to an instantaneous state of the physical system. This may include, for each body/node, one or more of: a 3D e.g. Cartesian position, an orientation e.g. a 4D quaternion orientation or a sine and cosine joint angle, and a 3D linear and/or 3D angular velocity. The dynamic graph may also include, for each joint/edge, the magnitude of one or more actions applied to the joint e.g. as a force, acceleration, torque, velocity target, motor voltage or current or the like. Actions may also include actions to control navigation e.g. steering, movement, braking and/or acceleration of a vehicle.

An unused parameter, e.g. a joint to which no force is applied, may be set to zero. In implementations since the edges are directed each edge may be duplicated and a flag feature e.g. ±1 used to indicate direction.

Two graphs may be combined by graph concatenation i.e. by concatenating their edge, node, and global features. Similarly a graph may be split by splitting the edge, node, and global features of one graph to form two new graphs with the same structure.

The graph neural network block 110 processes the input graph $G=(g, \{n_i\}, \{e_j, s_j, r_j\})$ to determine an output graph $G^*=(g^*, \{n_i^*\}, \{e_j^*, s_j, r_j\})$. In general, though not necessarily, the input and output graphs may have different features. In implementations the input graph comprises a combination, e.g. concatenation, of the static and dynamic graphs $G_s$ and $G_d$.

The graph neural network block 110 has three sub-functions, and edge-wise function $f_e$, a node-wise function $f_n$, and a global function $f_g$. Each of these is implemented with a different respective neural network i.e. a neural network with different parameters (weights), i.e. an edge neural network, a node neural network, and a global feature network respectively. In variants, some features and/or updates may be omitted.

In some implementations each of these functions is implemented with a respective multi-layer perceptron (MLP). In some implementations one or more of these functions may be implemented using a recurrent neural network. In this case (not shown) the function i.e. recurrent neural network takes an additional hidden state as an input and provides an updated hidden state as an output. This may be viewed as graph neural network block 110 processing the input graph G and a hidden graph $G_h$ to provide the output graph $G^*$ and an updated hidden graph $G^*_h$; alternatively the input graph may be viewed as including the hidden graph. The input and hidden graphs may be combined e.g. using a GRU (Gated Recurrent Unit) style or LSTM (Long Short-Term Memory) style gating scheme.

In implementations the graph neural network block 110 is configured to process the input graph by first applying the edge-wise function $f_e$ to update all the edges (in each specified direction) and then applying the node-wise function $f_n$ to update all the nodes, and finally applying the global function $f_g$ to update the global feature.

Figure 2:
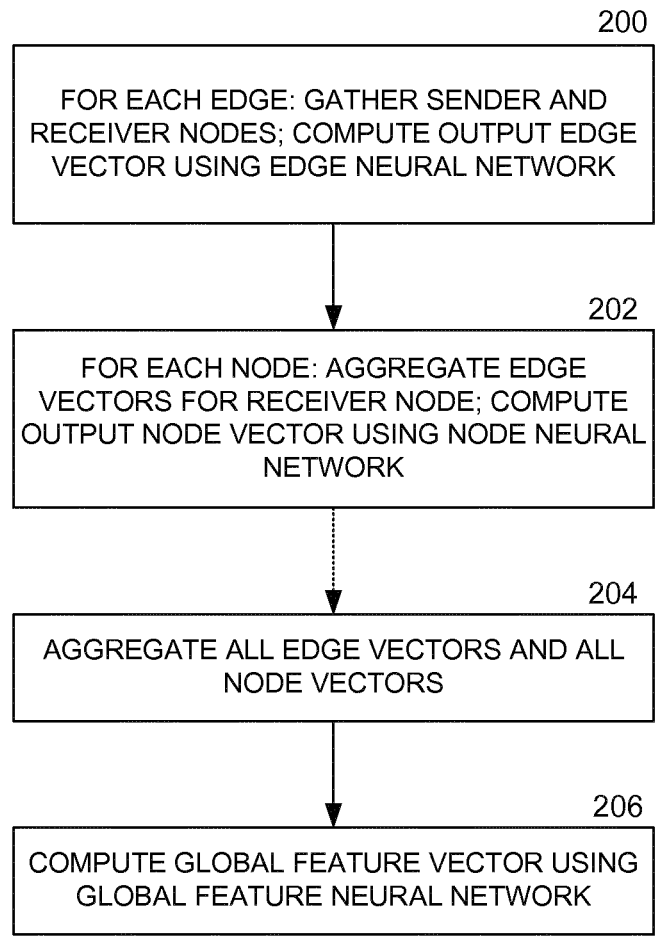
FIG. 2 illustrates operation of the example graph neural network block.

FIG. 2 illustrates operation of the example graph neural network block 110. At step 200 the process, for each edge $\{e_j, s_j, r_j\}$, gathers the sender and receiver node features $n_{sj}$, $n_{rj}$ and computes the output edge vectors, $e^*_j = f_e(g, n_{sj}, n_{rj}, e_j)$ using the edge neural network. Then at step 202, for each node $\{n_i\}$, the process aggregates the edge vectors for that node as receiver using an aggregation function to determine a set of aggregated edge features $ê_i$. The aggregation function should be invariant with respect to permutations of the edge vectors. For example it may comprise determination of a mean or maximum or minimum value. In some implementations the aggregation function may comprise element-wise summation e.g. $ê_i = \Sigma_j e^*_j$; for edges with $r_j = i$. Then the output node vector $n^*_i$ is computed using the node neural network, $n^*_i = f_n(g, n_i, ê_i)$. Finally the process aggregates all the edge and node vectors, step 204, e.g. by element wise summation: $ê = \Sigma_j e^*_j$, $n̂ = \Sigma_i n^*_i$ and computes the global feature vector g using the global feature neural network, $g^* = f_g(g, n̂, ê)$.

FIG. 3a shows a first example of a graph processing neural network prediction system 106 for the neural network system 100. In FIG. 3a each of blocks $GN_1$ and $GN_2$ comprises a graph neural network block 110 as previously described. The parameters of $GN_1$ and $GN_2$ are unshared and the two GN blocks operate sequentially in a "deep" architecture. The first graph neural network block $GN_1$ receives an input graph G and outputs a latent graph G' comprising a latent representation of the physical system. The latent graph G' is concatenated with the input graph G, implementing an optional graph skip connection, and the concatenated result is provided as an input to graph neural network block $GN_2$ which provides an output graph $G^*$. In implementations the input graph comprises a combination, e.g. concatenation, of the static graph $G_s$ and of the dynamic graph $G_d$ for a time step, and the output graph $G^*$ defines a next dynamic state of the physical system. That is the output graph contains information about the predicted state of the physical system at a next time step, such as information predicting values of any or all of the features of nodes of the dynamic graph (the next dynamic state). In implementations $GN_1$ and $GN_2$ are trained jointly, as described later.

In implementations using two sequential graph neural network blocks provides a substantial performance benefit for some physical systems because the global output g' from $GN_1$ allows all the edges and nodes to communicate with one another. This helps to model long range dependencies that exist in some structures by propagating such dependencies across the entire graph. However a similar benefit may be obtained with a deeper stack of graph blocks without use of a global output. Similarly it is not essential for each graph block to update both the nodes and the edges.

FIG. 3b shows a second example of a graph processing neural network prediction system 106 for the neural network system 100. In FIG. 3b blocks $GN_1$ and $GN_2$ comprise, respectively, a recurrent and a non-recurrent graph neural network block 110, each as previously described. In the example, recurrent block $GN_1$ implements a GRU recurrent neural network for one or more of the edge, node, and global feature neural networks, with an input comprising a hidden graph $G_h$ as well as a concatenation of the static and dynamic graphs $G_s$ and $G_d$ and an output comprising an updated hidden graph $G^*_h$ as well as $G^*$. In use the recurrent graph processing neural network prediction system 106 is provided with a sequence of input graphs representing a sequence of dynamic states of the physical system, and provides an output graph which predicts a next dynamic state of the physical system.

The graph processing neural network prediction systems 106 shown in FIG. 2 may be wrapped by input and output normalization blocks as described later (not shown in FIG. 2).

In implementations the graph processing neural network prediction system 106 for the neural network system 100 is trained to predict dynamic state differences, and to compute an absolute state prediction the input state is updated with the predicted state difference. To generate a long range rollout trajectory the absolute state predictions and actions, e.g. externally specified control inputs, are iteratively fed back into the prediction system 106. In implementations the input data to the prediction system 106 is normalized, and the output data from the prediction system 106 is subject to an inverse normalization.

In some applications the static data may be partially or completely lacking. In such cases the static data may be inferred from observations of the behavior of the physical system.

FIG. 4a shows an example neural network system 400 which infers static properties of the physical system as a system identification graph, $G_{id}$ 414. The system identification graph 414 is a latent graph, that is it defines a latent representation of the static properties, and this implicit representation is made available to the graph processing neural network prediction system 106 instead of the static graph $G_s$. The system identification graph $G_{id}$ may encode properties such as the mass and geometry of the bodies and joints.

In FIG. 4a data 404 from the physical system 102 defines a sequence of dynamic graphs $G_d$, i.e. a dynamic graph for each of a sequence of T time steps. This is provided to a graph processing neural network inference system 410 comprising one or more graph neural network blocks 412 which process the dynamic graph sequence to provide the system identification graph $G_{id}$=G*(T) as an output after T time steps. The system identification graph $G_{id}$ is combined, e.g. concatenated, with an input dynamic graph $G_d$ and provided to the graph processing neural network prediction system 106, which operates as previously described to predict a next dynamic state of the physical system. The input dynamic graph $G_d$ combined with $G_{id}$ may be a dynamic graph of the sequence, e.g. a final graph of the sequence, or any other dynamic graph for a time step.

The neural network system 400 may include a training engine 420 to train both the graph processing neural network inference system 410 and the graph processing neural network prediction system 106 as described later. The training encourages the graph processing neural network inference system 410 to extract static properties from the input dynamic graph sequence. During the joint training the neural network system 400 learns to infer unobserved properties of the physical system from behavior of the observed features and to use them to make more accurate predictions.

FIG. 4b shows an example graph processing neural network inference system 410 which uses a recurrent graph neural network block $GN_p$. This inputs a dynamic state graph $G_d$ and hidden graph $G_h$, which are concatenated, and outputs a graph which is split into an output graph G* and an updated hidden graph $G^*_h$.

Figure 5:
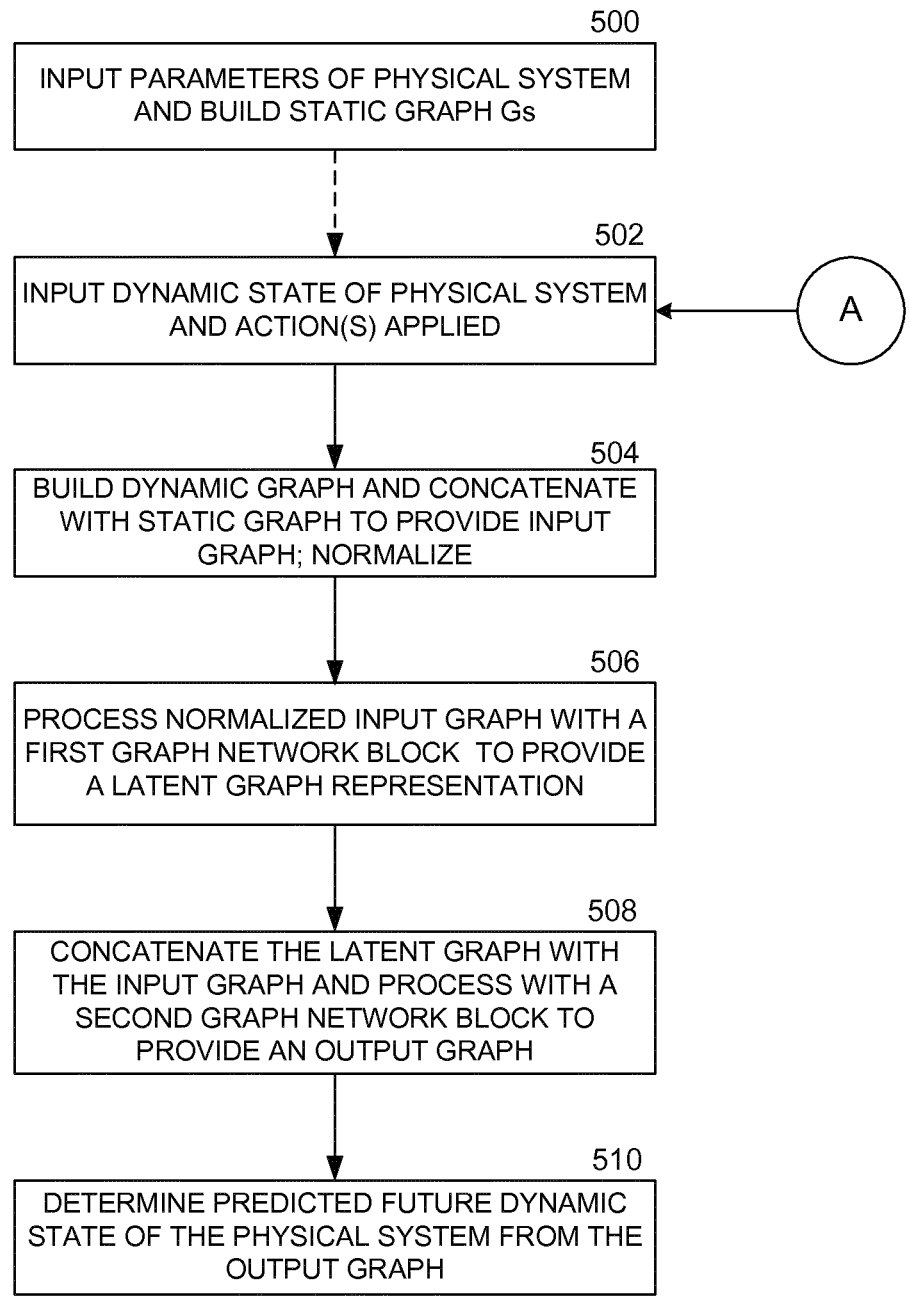
FIG. 5 shows a process for using a neural network system for a one-step prediction of a future dynamic state of a physical system.

FIG. 5 shows a process for using the neural network system 100 of FIG. 1a with a prediction system as shown in FIG. 3a or 3b, for a one-step prediction of a future dynamic state of the physical system 102. As a preliminary step 500 the process inputs static parameters of the physical system as previously described and builds a static graph $G_s$. Alternatively a system identification graph, $G_{id}$ may be used. At step 502 the process inputs data, $x^t$ defining a dynamic state of the physical system at time t, and data, $a^t$ defining the actions applied to the joints (edges). The process then builds the dynamic graph nodes $N_d^t$ using $x^t$ and the dynamic graph edges $E_d^t$ using $a^t$ and builds a dynamic graph $G_d$ from the nodes and edges. The static and dynamic graphs are then concatenated to provide an input graph $G_i$=concat($G_s$, $G_d$) (step 504).

The process may then normalize the input graph, $G_i^n$=Norm$_{in}$($G_i$) using an input normalization. The input normalization may perform linear transformations to produce zero-mean, unit-variance distributions for each of the global, node, and edge features. For node/edge features the same transformation may be applied to all the nodes/edges in the graph without having specific normalizer parameters for different bodies/edges in the graph. This allows re-use of the same normalizer parameters for different numbers and types of nodes/edges in the graph.

At step 506 the normalized input graph $G_i^n$ is then processed by a first prediction system graph network block (e.g. $GN_1$ or G-GRU) to provide a latent graph comprising a latent representation of the physical system, e.g. G'=$GN_1$($G_i^n$). The latent graph is then concatenated with the input graph (graph skip connection) and processed by a second prediction system graph network block (e.g. $GN_2$) to obtain an output graph i.e. a predicted dynamic graph G*=$GN_2$(concat($G_i^n$, G')) (step 508). In some implementations rather than predicting an absolute dynamic state, by training the output graph predicts a change in dynamic state (node features of the output graph are delta values from $N_d^t$ to $N_d^{t+1}$, $\Delta N_d^n$).

The process then determines a predicted future dynamic state of the physical system from the output graph (step 510). In implementations this involves obtaining values of the delta node features of the output graph, $\Delta N_d^n$, optionally applying an inverse output normalization to obtain predicted delta dynamic node values, $\Delta N_d$=Norm$_{out}^{-1}$($\Delta N_d^n$), obtaining values of the dynamic node features for time t+1, $N_d^{t+1}$ by updating the dynamic graph nodes $N_d^t$ with the predicted delta dynamic node values $\Delta N_d$, and then extracting one or more values for the predicted next dynamic state $x^{t+1}$. Inverse normalization applied to the output graph nodes allows the graph processing neural network prediction system 106 to provide output nodes with zero mean and unit variance. Updating the input $x^t$ may comprise addition of the corresponding change for position and linear/angular velocity. For orientation the output node value may represent a rotation quaternion between the input orientation and a next orientation (forced to have a unit norm), and the update may be computed with a Hamilton product.

Where the neural network system 100 uses a recurrent prediction system as shown in FIG. 3b the process is essentially the same, but the input to the first prediction system graph network block includes a hidden graph $G_h$ and the first prediction system graph network block provides a first layer output graph comprising the latent graph and an updated hidden graph $G^*_h$. The process may therefore include initializing the hidden graph $G_h$ e.g. to an empty state and optionally processing for a number of time steps to "warm up" this initial state. In some implementations the process takes a sequence of T dynamic graphs as input and then predicts a dynamic graph at a next time step following the end of the sequence. This may be iteratively repeated to predict a dynamic graph for each successive time step.

Figure 6:
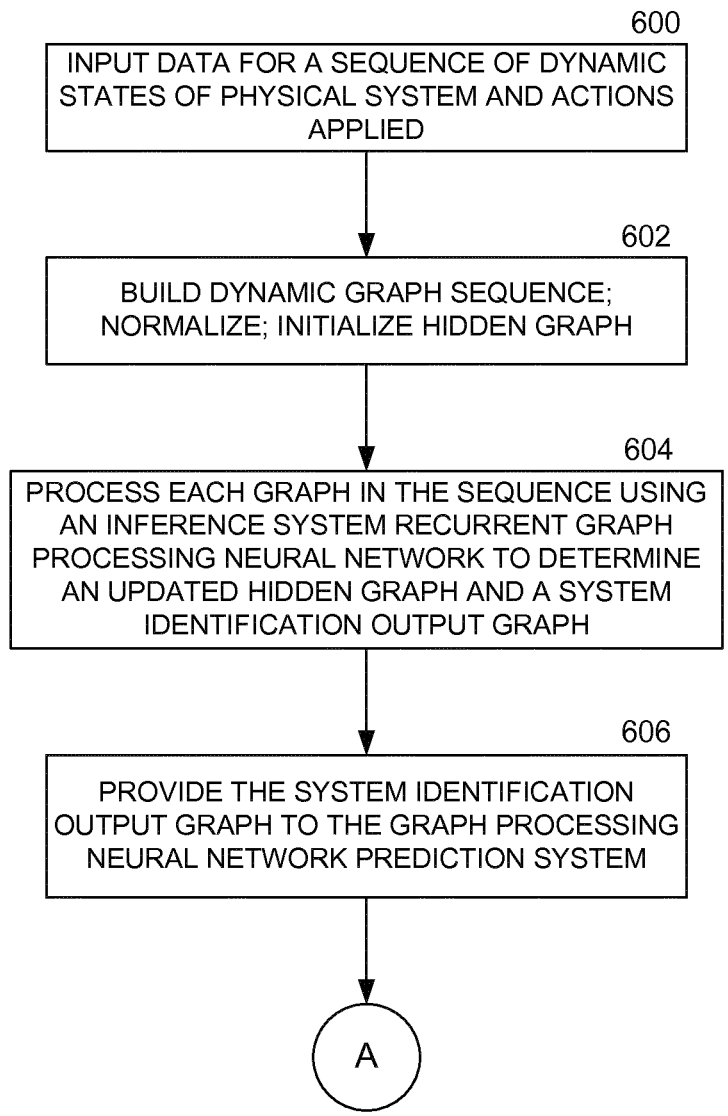
FIG. 6 shows a process for using a neural network system to infer static properties of a physical system.

FIG. 6 shows a process for using the neural network system 400 of FIG. 4a to infer static properties of the physical system 102, and to use the inferred properties for a one-step prediction of a future dynamic state. In some implementations the neural network system 400 inputs a system state and a set of one or more actions (i.e. a dynamic graph) for a physical system and a sequence of observed system states and actions for the same physical system. To generate a rollout trajectory, system identification i.e. generation of a system identification graph $G_{id}$, needs only to be performed once as the same $G_{id}$ may be used for each of the one-step predictions generating the trajectory.

Thus the process inputs data for a sequence of dynamic states, $x^{seq}$ of the physical system and corresponding actions applied, $a^{seq}$ (step 600). The process then builds a dynamic graph sequence $G_d^{seq}$ and initializes the input hidden graph $G_h$ e.g. to an empty state (step 602). Each graph in the sequence is then processed using a recurrent graph processing neural network inference system $GN_p$ e.g. as shown in FIG. 4b (step 604). This may involve input normalizing each dynamic graph $G_d^t$ of the sequence $G_d^{seq}$, concatenating the normalized graph with the current hidden graph, and processing the concatenated graphs to determine an updated hidden graph and an output graph $G_o$, e.g. $G_o$, $G_h = GN_p$ ($Norm_{in}(G_d^t), G_h$). The final output graph may be used as the system identification graph $G_{id} = G_o$. Once the system identification graph $G_{id}$ has been determined (already normalized) it may be provided to the graph processing neural network prediction system 106 in place of static graph $G_s$ (step 606) and the process continues with step 502 of FIG. 5. Thus the prediction system 106 may be provided with a dynamic graph at some later time step t to predict one or more values for the next dynamic state $x^{t+1}$ as before.

Figure 7:
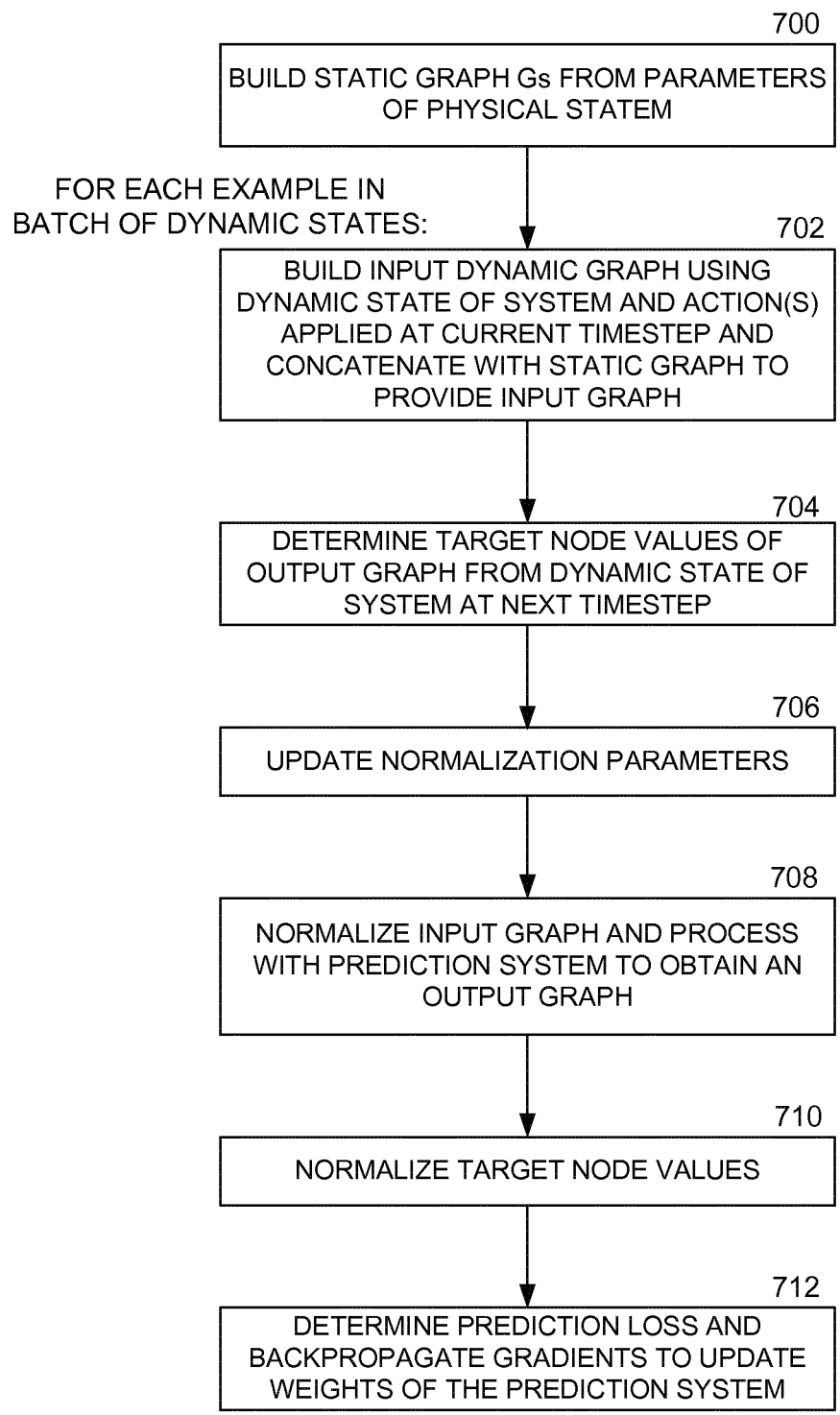
FIG. 7 shows an example process for training a graph processing neural network prediction system.

FIG. 7 shows an example training process for training a graph processing neural network prediction system 106 as shown in FIGS. 1a and 2a; a similar process may be used with the prediction system 106 of FIG. 2b. The order of steps shown in FIG. 7 can be altered. The process uses training data captured from an example of the physical system, or from a similar physical system as previously described, or from multiple different physical systems. The training data may represent random motion of the system and/or it may comprise data representing the system performing a task, such as data from a robot performing a task such as a grasping or other task.

Initially the process builds a static graph $G_s$ from parameters of the physical system, as previously described (step 700). For each example in a batch of training dynamic states the process also builds an input dynamic graph $G_d$ from data, $x^t$ defining the dynamic state of the physical system at a current time step t, and data, $a^t$ defining the actions applied to the joints (as previously described with reference to FIG. 5). For each example the process also builds a set of output dynamic graph nodes $N_d^{t+1}$ from data $x^{t+1}$ defining the dynamic state at time t+1 (step 702). In implementations the process adds noise, e.g. random normal noise, to the input dynamic graph nodes $N_d^t$. This helps the system to learn to put back together physical system representations that have slightly dislocated joints, which in turn helps to achieve small rollout errors. The process then builds an input graph $G_i$ for each example by concatenating the respective input dynamic graph $G_d$ and static graph $G_s$ (step 702).

The process then determines target node values of the output graph from the output dynamic graph nodes i.e. from the dynamic state of the system at the next time step (step 704). In implementations these target node values comprise changes in the node feature values from time t to t+1, $\Delta N'_d$.

The process may also update input and output normalization parameters (step 706). This may involve accumulating information about the distributions of the input edge, node, and global features, and information about the distributions of the changes in dynamic states of the nodes. The information may comprise a count, sum, and squared sum for estimating the mean and standard deviation of each of the features. Thus the process may update parameters of an input normalization $Norm_{in}$ and/or an output normalization $Norm_{out}$ for the graph processing neural network prediction system 106.

The process then obtains a normalized input graph $G_i^n = Norm_{in}(G_i)$ and processes this using the graph processing neural network prediction system 106 to obtain predicted values for the (normalized) delta node features of the output graph, $\Delta N_d^n$, for the example of FIG. 3a from $GN_2$ (concat $(G_i^n, GN_1(G_i^n))$) (step 708). The process also obtains normalized target node values $\Delta N'^n_d = Norm_{out}(\Delta N'_d)$ (step 710).

A prediction loss is then determined from the predicted values for the (normalized) delta node features of the output graph, $\Delta N_d^n$ and the normalized target node values $\Delta N'^n_d$, for example representing a difference between these values. In implementations the loss comprises an L2-norm (Euclidean distance) between the values of features of the normalized expected and predicted delta nodes. These features may comprise delta values (changes) in e.g. position and/or linear/angular velocity. Normalizing can help to balance the relative weighting between the different features. When an orientation is represented by a quaternion q (q and −q representing the same orientation), an angular distance between a predicted rotation quaternion $q_p$ and an expected (actual) rotation quaternion $q_e$ may be minimized by minimizing the loss $1 - \cos^2(q_e \cdot q_p)$. The graph processing neural network prediction system 106 is then trained by backpropagating gradients of the loss function to adjust parameters (weights) of the system, using standard techniques e.g. ADAM (Adaptive Moment Estimation) with optional gradient clipping for stability (step 712).

The training is similar where a recurrent graph processing neural network prediction system 106 is used (FIG. 2b) but each example of the training batch may comprise a sequence of dynamic graphs representing a sequence of states of the physical system and the recurrent system may be trained using a teacher forcing method. For example for a sequence of length T (e.g. T=21) the first T−1 dynamic graphs in the sequence are used as input graphs whilst the last T−1 graphs in the sequence are used as target graphs. During training the recurrent system is used to sequentially process the input graphs producing, at each step, a predicted dynamic graph, which is stored, and a graph state (hidden graph), which is provided together with the next input graph in the next iteration. After processing the entire sequence, the sequences of predicted dynamic graphs and target graphs are used together to calculate the loss.

Figure 8:
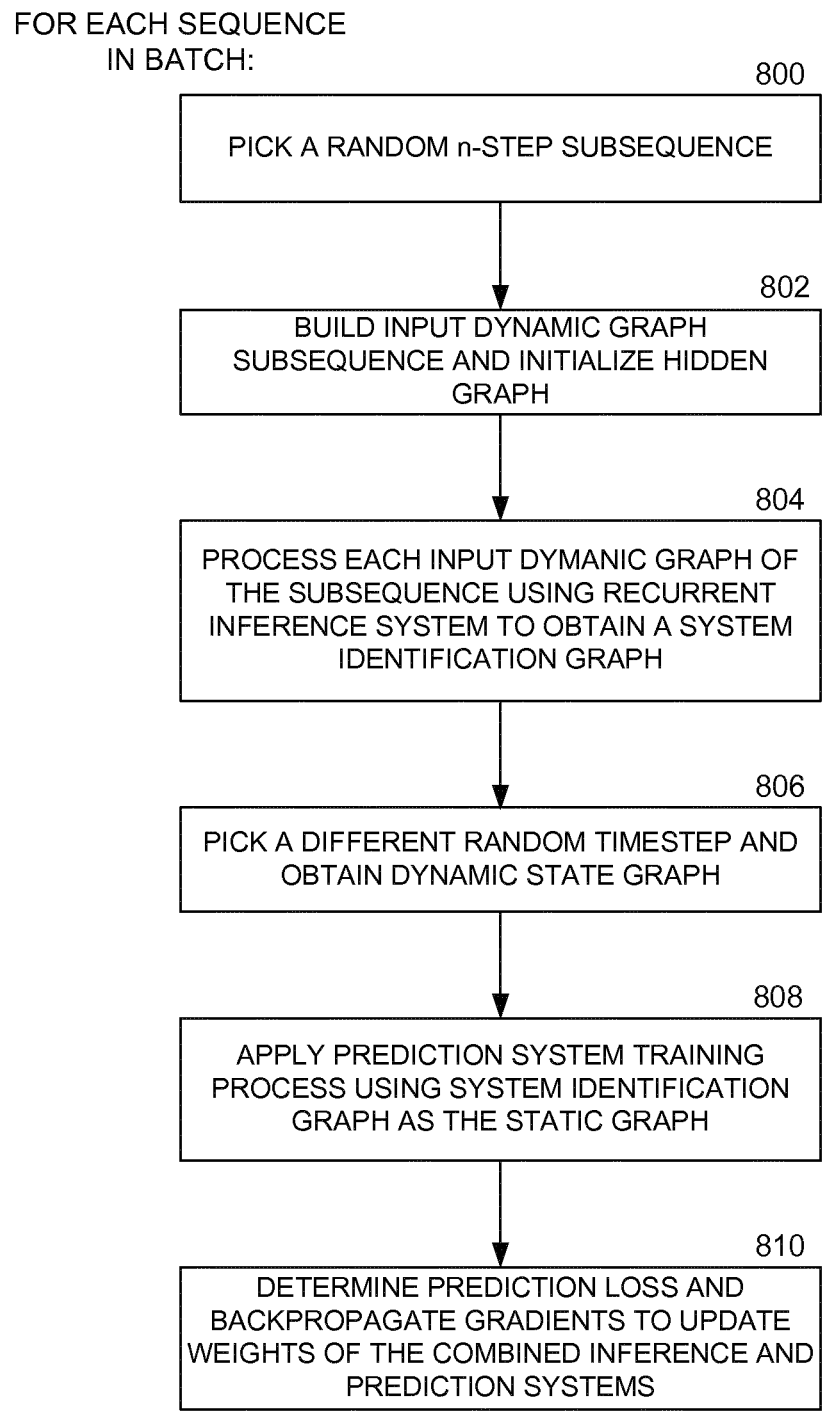
FIG. 8 shows an example process for training a neural network system including a graph processing neural network inference system.

FIG. 8 shows an example training process for training a neural network system 400 including a graph processing neural network inference system 410, as shown in FIGS. 4a and 4b. In implementations the system is trained end-to-end, that is the inference system 410 and prediction system 106 are trained in tandem. In implementations the training uses a batch of sequences of states of the physical system, e.g. a batch of 100-step sequences, each sequence comprising a sequence of dynamic states, $x^{seq}$ of the physical system and corresponding actions applied, $a^{seq}$.

For each sequence in the batch the process picks a random n-step subsequence $x^{subseq}$, $a^{subseq}$ (step 800), e.g. n=20, builds a dynamic graph subsequence $G_d^{subseq}$, and initializes the hidden state graph $G_h$ to an empty state (step 802). Then each dynamic graph $G_d^t$ in the subsequence is processed using the recurrent inference system 410 i.e. by the recurrent graph neural network block $GN_p$, e.g. $G_o$, $G_h$=$GN_p$(Norm$_{in}$ ($G_d^t$),$G_h$) (step 804). The final output graph of the subsequence is assigned as the system identification graph, $G_{id}$=$G_o$.

The process then picks a different random time step from the sequence and obtains the corresponding dynamic state graph from the state and action(s) applied (step 806). This is concatenated with the system identification graph, $G_{id}$ as the static graph and provided as an input to the training process of FIG. 7, starting at step 704 (step 808). The process then determines a prediction loss as previously described (step 712) and backpropagates gradients to update the parameters (weights) of both the graph processing neural network prediction system 106 and the graph processing neural network inference system 410.

Thus in implementations the training samples a random n-step subsequence to train the system identification (inference) recurrent graph neural network block $GN_p$ and samples a random supervised example, e.g. from the sequence, to provide a single loss based on the prediction error. This separation between the subsequence and the supervised example encourages the recurrent graph neural network block $GN_p$ to extract static properties that are independent from the specific n-step trajectory and useful for making dynamics predictions under any conditions.

Figure 9:
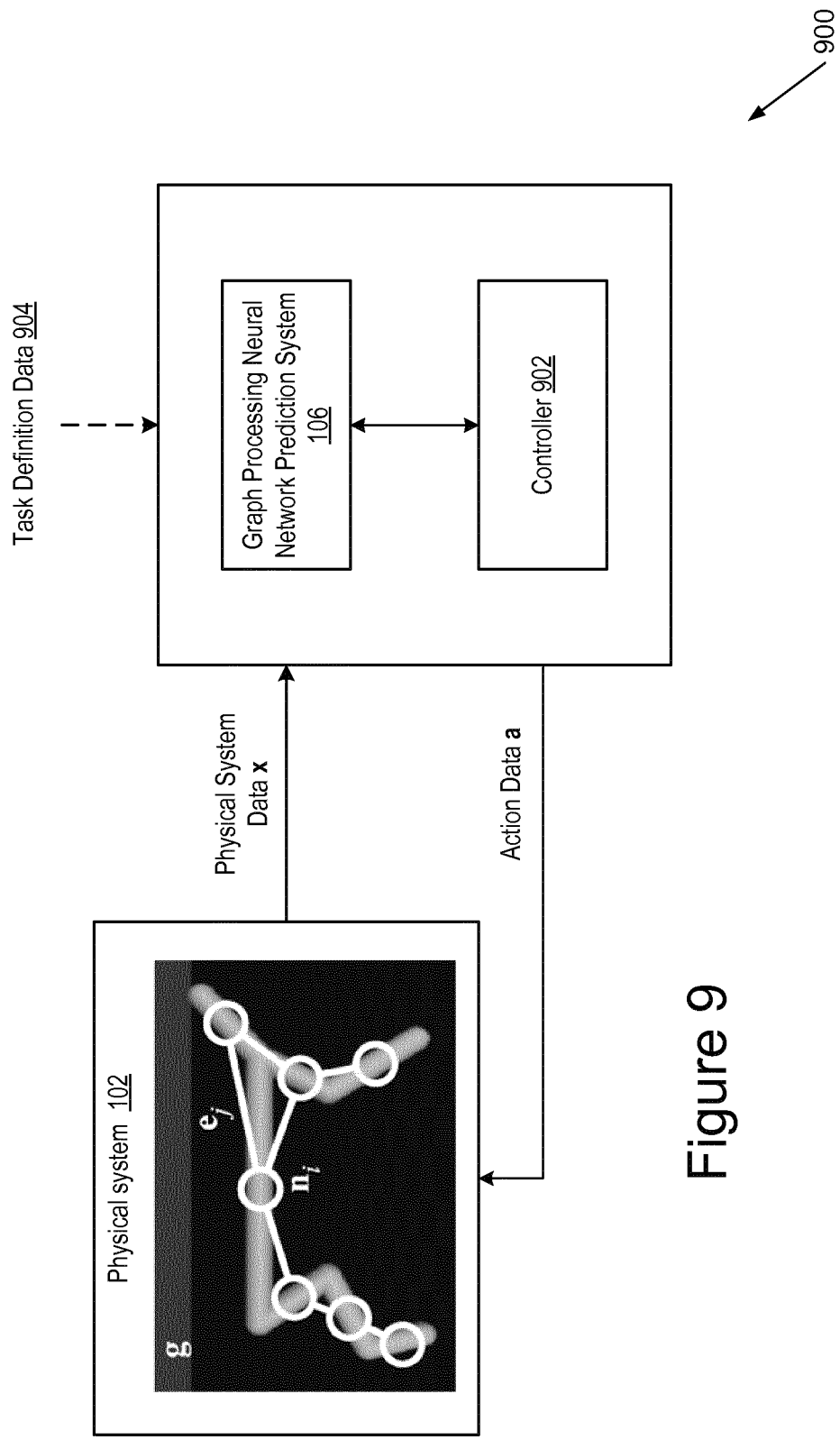
FIG. 9 shows an example control system for controlling a physical system using a graph processing neural network prediction system.

FIG. 9 shows an example of a control system 900 for controlling the physical system 102 using a graph processing neural network prediction system 106 as described above (with or without the described system identification). The control system 900 includes a controller 902 which interacts with the prediction system 106 to control the physical system. Optionally the control system 900 includes an input for task definition data defining a task to be performed by the physical system; in other implementations the control system 900 learns to perform a task e.g. based on rewards received from the physical system and/or its environment.

In one implementation the controller 902 uses the prediction system 106 for Model Predictive Control (MPC). For example the controller uses the prediction system to plan ahead for a number of time steps, n (the planning horizon), and then determines the derivative of a trajectory cost function to optimize the trajectory by gradient descent, which can be done because the prediction system 106 is differentiable. For example an (analytical) cost function may be determined by a difference between a predicted trajectory and a target trajectory, and derivatives may be taken with respect to the actions and gradient descent applied to optimize the actions i.e. to minimize the cost function. The cost function may include a total cost (or reward) associated with the trajectory e.g. a squared sum of the actions.

Figure 10:
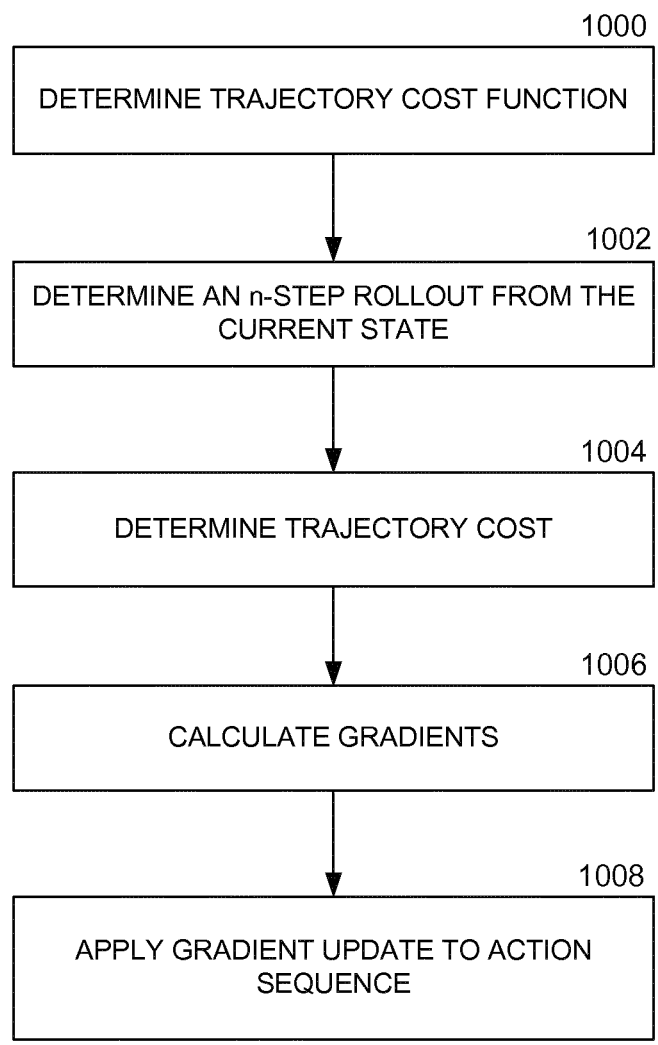
FIG. 10 shows an example Model Predictive Control (MPC) process.

FIG. 10 shows an example MPC process. The process may start from an initial system state $x^o$ and a randomly initialized sequence of actions $\{a^t\}$, as well as the pre-trained prediction system 106 (and optionally inference system 410). A differentiable trajectory cost function is defined dependent upon the states and actions, e.g. $c$=$C(\{x^t\}, \{a^t\})$ (step 1000). For example where a defined task is to follow a target system trajectory, where trajectory is used broadly to mean a sequence of states rather than necessarily a spatial trajectory, the cost function may comprise a squared difference between a state and a target state at each time step. Optionally multiple cost/reward functions may be used simultaneously. The cost function may also include a cost dependent upon the actions e.g. an L1 or L2 norm of the actions.

The process then determines an n-step rollout from the current state using the prediction system 106, e.g. iteratively determining $x_r^{t+1}$=$M(x_r^t, a^t)$ where M is the prediction system model (step 1002), and determines the rollout trajectory cost, e.g. $c$=$C(\{x_r^t\}, \{a^t\})$ (step 1004). The process then determines gradients of the cost function with respect to the actions, e.g.

$$\{g_a^t\} = \frac{\partial c}{\partial \{a^t\}},$$

both the cost function and prediction system being differentiable (step 1006). The process then applies a gradient update to $\{a^t\}$, e.g. by subtracting $$\alpha \frac{\partial c}{\partial \{a^t\}}$$

to optimize the action sequence (step 1008).

Some implementations use the process with a receding horizon, iteratively planning with a fixed horizon, by applying a first action of a sequence, increasing the horizon by one step, and re-using the shifted optimal trajectory computed in the previous iteration. Ine some implementations n may be in the range 2 to 100 from each initial state; an additional n iterations may be used at the very first initial state to warm up the initially random action sequence. Implementations of the described systems are able accurately to control a physical system, e.g. in 3D, using a learned model i.e. prediction system 106.

Figure 11:
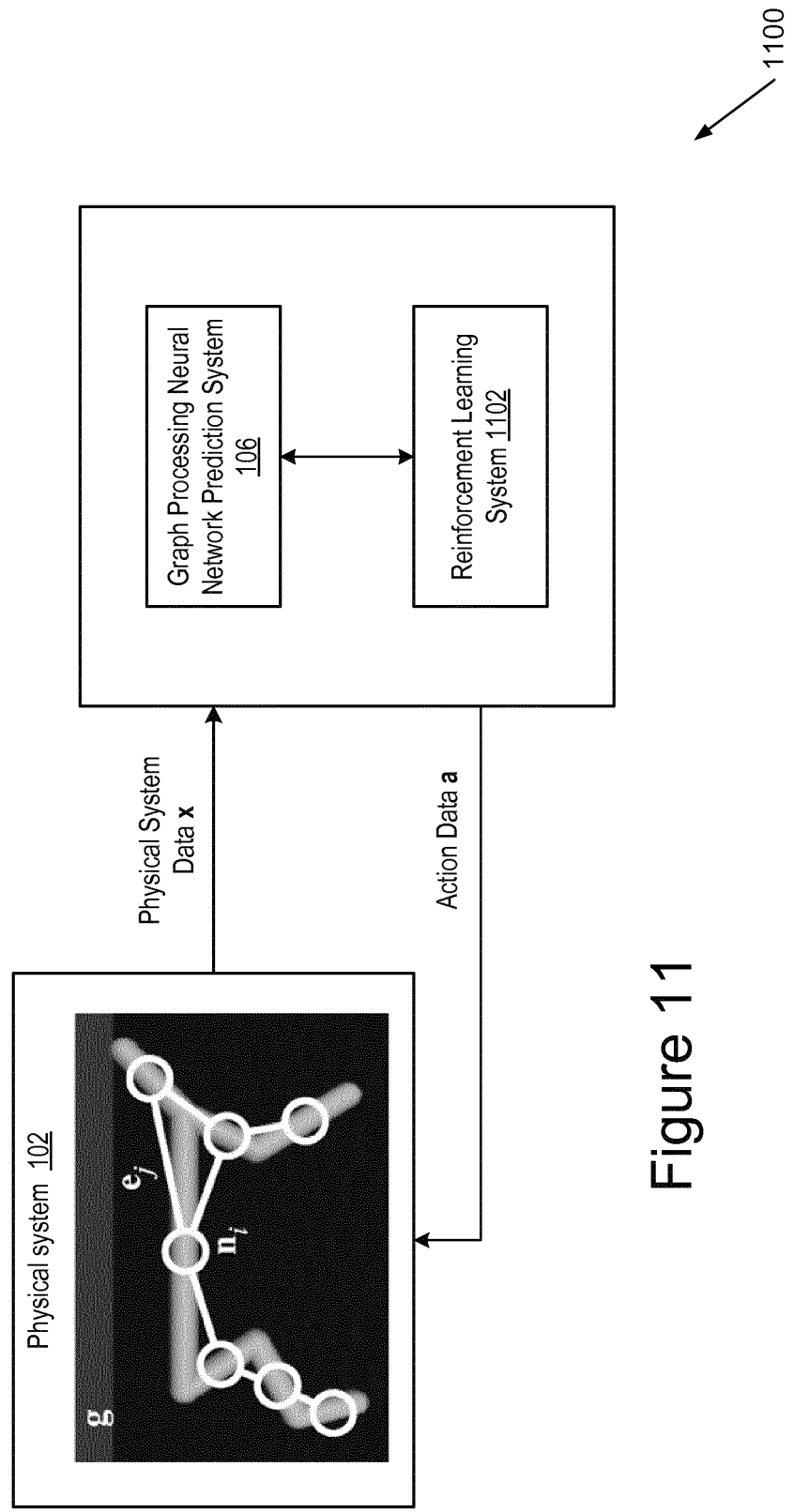
FIG. 11 shows an example control system for controlling a physical system using a reinforcement learning system including a graph processing neural network prediction system.

As shown in FIG. 11 the prediction system 106 may also be used in control system 1100 comprising a reinforcement learning system 1102 e.g. to learn a control policy. For example the prediction system 106 may be used for determining an expected return based on a next one or more states of the physical system generated by the prediction system, and a gradient of this may be employed for a continuous or discrete action-selection policy update. In implementations a neural network defining the action selection policy, i.e. having an output for selecting an action, is trained jointly with the prediction system rather than using a pre-trained model, although a pre-trained model may be used.

In such an approach the prediction system may be used to predict environment observations rather than a full state of the physical system. That is, the inferred dynamic state of the physical system may be expressed in terms of observations of the physical system rather than, say, using the physical system, e.g. robot, as a point of reference. For example the node features may include a feature e.g. a one-hot vector, to indicate whether the node is part of the environment, such as a target position, or a body part, and optionally what type of body part e.g. head/tail, arm/finger. An edge feature may indicate the relative distance and/or direction of a node representing a body part of the physical system to a target node in the environment. Thus a dynamic graph may indicate e.g. the vector distance of a reference node of the physical system to a node in the environment, and joint angles and velocities relative to coordinates of the reference node.

Heess et al., "Learning Continuous Control Policies by Stochastic Value Gradients" arXiv: 1510.09142 describes an example of a SVG-based reinforcement learning system within which the prediction system 106 may be used. By way of further example, in a variant of the SVG(N) approach a policy gradient of an action-value function estimator using a 1-step horizon is given by $$\nabla_\theta L(\theta) = \nabla_{\theta E}[r_t(x_t, a_t) + \gamma Q_\theta(x_{t+1}, a_t)]$$

where $x_{t+1} = M(x_t, a_t)$ is the state prediction for time step t+1 from the prediction system model M, $r_t(x_t, a_t)$ is the reward received from the environment in state $x_t$ by performing action $a_t$ at time t, $\gamma$ is a discount factor, and $Q_\theta$ denotes an action-value function based on state x and action a. The action $a_t$ at time t is determined by selecting from a distribution having parameters determined by the output of a policy neural network $\pi_\theta$ with parameters $\theta$ (the gradient of the expectation is determined using the "re-parameterization trick" (Kingma and Welling "Auto-Encoding Variational Bayes" arXiv: 1312.6114). The value of Q is provided by a neural network which may share parameters with the policy neural network (e.g. it may be a separate head on a common core neural network); $x_{t+1} = M(x_t, a_t)$ where M is the prediction system model.

In this example learning is performed off-policy, that is sequences of states, actions, and rewards are generated using a current best policy $\pi$ and stored in an experience replay buffer, and then values of $x_t$ are sampled from the buffer for calculating the policy gradient. The policy is optimized by backpropagating the policy gradient to adjust parameters (weights) of the neural networks by stochastic gradient descent to find $\text{argmin}_\theta(\theta)$.

The sizes of the neural networks will depend upon the application, size of the graphs, numbers of features, amount of training data and so forth. Purely by way of indication, the edge, node and global MLPs way have 1-5 layers each of a few hundred units; the recurrent neural networks may be smaller; ReLU activations may be used; the systems may be implemented in TensorFlow™. Of order $10^5$ plus training steps may be used; the learning rate may start at e.g. $10^{-4}$. In some implementations, the physical system may be an electromechanical system interacting with a real-world environment. For example, the physical system may be a robot or other static or moving machine interacting with the environment to accomplish a specific task, e.g., to locate an object of interest in the environment or to move an object of interest to a specified location in the environment or to navigate to a specified destination in the environment; or the physical system may be an autonomous or semi-autonomous land or air or sea vehicle navigating through the environment. In some implementations the physical system and its environment are simulated e.g. a simulated robot or vehicle. The described neural network systems may be trained on the simulation before being deployed in the real world.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A neural network system for processing data representing a robotic system, the neural network system comprising one or more computers and one or more storage devices storing instructions that when executed by the one or more computers cause the one or more computers to perform operations comprising:

receiving, as an input, robotic data characterizing the robotic system and action data, wherein the robotic system comprises bodies coupled by joints, wherein the robotic data comprises (i) dynamic data representing a dynamic state defined by motions of at least one of the bodies of the robotic system and (ii) static data representing static properties of at least one of the bodies or joints of the robotic system, and wherein the action data represents one or more actions applied to the joints of the robotic system;

processing an input graph derived from the robotic data using a graph processing neural network comprising two or more graph network blocks including (i) a first graph network block trained to process the input graph to provide a latent graph comprising a latent representation of the robotic system; and (ii) a second graph network block trained to process data from the latent graph to provide an output graph, wherein the input and output graphs each have a graph structure comprising a plurality of nodes connected by a plurality of edges, wherein the nodes represent the bodies of the robotic system and the edges represent the joints of the robotic system, wherein the input graph has input graph nodes comprising input graph node features and has input graph edges, each input graph edge comprising respective input graph edge features representing one or more actions applied to the respective joint represented by the respective input graph edge, wherein the input graph comprises a dynamic graph and a static graph, the dynamic graph comprising input graph node features representing the dynamic data and input graph edge features representing the action data, the static graph comprising input graph node or edge features representing the static properties of the bodies or joints of the robotic system; and wherein the output graph has (i) output graph nodes comprising output graph node features and (ii) output graph edges comprising output graph edge features, wherein the output graph node features comprise features for inferring a dynamic state of the robotic system predicting one or more future states of the robotic system;

wherein processing the input graph comprises:
for each of the edges, processing the respective input graph edge features representing the one or more actions applied to the respective joint using an edge neural network to determine the respective output graph edge features;
for each of the nodes, aggregating the output graph edge features for a respective set of edges representing a respective set of joints connecting to the respective body represented by the respective node in the graph structure to determine a set of aggregated edge features for the respective node; and
for each of the nodes, processing the respective aggregated edge features and the respective input graph node features using a node neural network to determine the respective output graph node features; and
providing, as an output, the inferred dynamic state of the robotic system predicting one or more future states of the robotic system, to a controller to control actions to be applied to the robotic system.

2. The neural network system as claimed in claim 1 wherein processing the input graph edge features using the edge neural network to determine the output graph edge features comprises, for each edge, providing the input graph edge features and the input graph node features for the nodes connected by the edge in the graph structure to the edge neural network to determine the output graph edge features.

3. The neural network system as claimed in claim 1 wherein the output graph further comprises a global feature output representing a collective state of the output graph edge features and the output graph node features, and wherein the graph processing neural network further comprises a global feature neural network to determine the global feature output.

4. The neural network system as claimed in claim 3, wherein the operations further comprise aggregating the set of aggregated edge features for each node and the output graph node features to provide an aggregated graph feature input to the global feature neural network, and wherein the global feature neural network is configured to process the aggregated graph feature input to determine the global feature output.

5. The neural network system as claimed in claim 1, wherein the operations further comprise combining the input graph with the latent graph; and wherein the second graph network block is configured to process a combination of the input graph and the latent graph to provide the output graph.

6. The neural network system as claimed in claim 1, wherein the input graph comprises a combination of the dynamic graph, the static graph, and a hidden graph;
wherein the graph processing neural network comprises a recurrent graph processing neural network to process the input graph to provide a first layer output graph comprising a combination of the latent graph and an updated hidden graph; and
wherein the operations further comprise providing the latent graph to the second graph network block and to provide the updated hidden graph back to an input of the recurrent graph processing neural network.

7. The neural network system as claimed in claim 1, wherein the input is configured to receive dynamic data and action data for a sequence of time steps for defining a sequence of input graphs, wherein, for each of the time steps, the input graph comprises a combination of a dynamic graph and a hidden graph, to define the sequence of input graphs, wherein the dynamic graph comprises the input graph node features representing the dynamic data for the time step and the input graph edge features representing the action data for the time step, wherein the graph processing neural network is configured to process the sequence of input graphs to determine, for each time step, a combination of the output graph and an updated hidden graph, wherein the updated hidden graph provides the hidden graph for the next time step; and wherein, after the sequence of time steps, the output graph comprises a system identification graph in which the output graph node features comprise a representation of static properties of the bodies and/or the joints of the robotic system.

8. The neural network system as claimed in claim 7, wherein the operations further comprise concatenating the dynamic graph and the hidden graph to provide the input graph, and splitting the combination of the output graph and the updated hidden graph to update the hidden graph.

9. The neural network system as claimed in claim 7, wherein the operations further comprise:
at least one further graph network block configured to receive a combination of the system identification graph and a dynamic graph, wherein the dynamic graph comprises graph node features representing dynamic data for an observed time and graph edge features representing action data for the observed time,
wherein the at least one further graph network block is trained to process the combination of the system identification graph and the dynamic graph to provide a dynamic state prediction graph having node features representing a future dynamic state of the robotic system at a time later than the observed time.

10. The neural network system as claimed in claim 9, the operations further comprising using a control system trained to provide action control outputs to maximize a reward predicted from the future dynamic state of the robotic system.

11. One or more non-transitory computer-readable storage media storing instructions that when executed by one or more computers cause the one or more computers to perform operations for processing data representing a robotic system, the operations comprising:

receiving, as an input, physical system robotic data characterizing the robotic system and action data, wherein the robotic system comprises bodies coupled by joints, wherein the robotic system data comprises at least (i) dynamic data representing a dynamic state defined by motions of at least one of the bodies of the robotic system and (ii) static data representing static properties of at least one of the bodies or joints of the robotic system, and wherein the action data represents one or more actions applied to the joints of the robotic system;

processing an input graph derived from the robotic data using a graph processing neural network comprising two or more graph network blocks including (i) a first graph network block trained to process the input graph to provide a latent graph comprising a latent representation of the robotic system; and (ii) a second graph network block trained to process data from the latent graph to provide an output graph, wherein the input and output graphs each have a graph structure comprising a plurality of nodes connected by a plurality of edges, wherein the nodes represent the bodies of the robotic system and the edges represent the joints of the robotic system, wherein the input graph has input graph nodes comprising input graph node features and has input graph edges, each input graph edge comprising respective input graph edge features representing one or more actions applied to the respective joint represented by the respective input graph edge, wherein the input graph comprises a dynamic graph and a static graph, the dynamic graph comprising input graph node features representing the dynamic data and input graph edge features representing the action data, the static graph comprising input graph node or edge features representing the static properties of the bodies or joints of the robotic system; and wherein the output graph has (i) output graph nodes comprising output graph node features and (ii) output graph edges comprising output graph edge features, wherein the output graph node features comprise features for inferring a dynamic state of the robotic system predicting one or more future states of the robotic system;

wherein processing the input graph comprises:
for each of the edges, processing the respective input graph edge features representing the one or more actions applied to the respective joint using an edge neural network to determine the respective output graph edge features;
for each of the nodes, aggregating the output graph edge features for a respective set of edges representing a respective set of joints connecting to the respective body represented by the respective node in the graph structure to determine a set of aggregated edge features for the respective node; and
for each of the nodes, processing the respective aggregated edge features and the respective input graph node features using a node neural network to determine the respective output graph node features; and providing, as an output, the inferred dynamic state of the robotic system predicting one or more future states of the robotic system, to a controller to control actions to be applied to the robotic system.

12. A method performed by one or more computers, the method comprising:

receiving, as an input, robotic data characterizing a robotic system and action data, wherein the robotic system comprises bodies coupled by joints, wherein the robotic data comprises (i) dynamic data representing a dynamic state defined by motions of at least one of the bodies of the robotic system and (ii) static data representing static properties of at least one of the bodies or joints of the robotic system, and wherein the action data represents one or more actions applied to the joints of the robotic system;

processing an input graph derived from the robotic data using a graph processing neural network comprising two or more graph network blocks including (i) a first graph network block trained to process the input graph to provide a latent graph comprising a latent representation of the robotic system; and (ii) a second graph network block trained to process data from the latent graph to provide an output graph, wherein the input and output graphs each have a graph structure comprising a plurality of nodes connected by a plurality of edges, wherein the nodes represent the bodies of the robotic system and the edges represent the joints of the robotic system, wherein the input graph has input graph nodes comprising input graph node features and has input graph edges, each input graph edge comprising respective input graph edge features representing one or more actions applied to the respective joint represented by the respective input graph edge, wherein the input graph comprises a dynamic graph and a static graph, the dynamic graph comprising input graph node features representing the dynamic data and input graph edge features representing the action data, the static graph comprising input graph node or edge features representing the static properties of the bodies or joints of the robotic system; and wherein the output graph has (i) output graph nodes comprising output graph node features and (ii) output graph edges comprising output graph edge features, wherein the output graph node features comprise features for inferring a dynamic state of the robotic system predicting one or more future states of the robotic system;

wherein processing the input graph comprises:
for each of the edges, processing the respective input graph edge features representing the one or more actions applied to the respective joint using an edge neural network to determine the respective output graph edge features;
for each of the nodes, aggregating the output graph edge features for a respective set of edges representing a respective set of joints connecting to the respective body represented by the respective node in the graph structure to determine a set of aggregated edge features for the respective node; and
for each of the nodes, processing the respective aggregated edge features and the respective input graph node features using a node neural network to determine the respective output graph node features; and providing, as an output, the inferred dynamic state of the robotic system predicting one or more future states of the robotic system, to a controller to control actions to be applied to the robotic system.

13. The method of claim 12, wherein processing the input graph edge features using the edge neural network to determine the output graph edge features comprises, for each edge, providing the input graph edge features and the input graph node features for the nodes connected by the edge in the graph structure to the edge neural network to determine the output graph edge features.

14. The method of claim 12, wherein the output graph further comprises a global feature output representing a collective state of the output graph edge features and the output
graph node features, and wherein the graph processing neural network further comprises a global feature neural network to determine the global feature output.

15. The method of claim 14, wherein the graph processing neural network is further configured to aggregate the set of aggregated edge features for each node and the output graph node features to provide an aggregated graph feature input to the global feature neural network, and wherein the global feature neural network is configured to process the aggregated graph feature input to determine the global feature output.

16. The method of claim 12, wherein the method further comprise:
combining the input graph with the latent graph, wherein the second graph network block is configured to process a combination of the input graph and the latent graph to provide the output graph.

17. The method of claim 12, wherein the input graph comprises a combination of the dynamic graph, the static graph, and a hidden graph;
wherein the graph processing neural network comprises a recurrent graph processing neural network to process the input graph to provide a first layer output graph comprising a combination of the latent graph and an updated hidden graph; and
wherein the method further comprise providing the latent graph to the second graph network block and to provide the updated hidden graph back to an input of the recurrent graph processing neural network.

* * * * *